(12) United States Patent
Nomizo et al.

(10) Patent No.: US 9,956,862 B2
(45) Date of Patent: May 1, 2018

(54) ENGINE UNIT SUPPORT STRUCTURE AND ENGINE UNIT MOUNTING METHOD

(71) Applicant: BRIDGESTONE CORPORATION, Tokyo (JP)

(72) Inventors: Junichi Nomizo, Tokyo (JP); Masayoshi Kawada, Tokyo (JP); Giichi Onuki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days. days.

(21) Appl. No.: 15/124,962

(22) PCT Filed: Apr. 27, 2015

(86) PCT No.: PCT/JP2015/062646
§ 371 (c)(1),
(2) Date: Sep. 9, 2016

(87) PCT Pub. No.: WO2015/174260
PCT Pub. Date: Nov. 19, 2015

(65) Prior Publication Data
US 2017/0015186 A1 Jan. 19, 2017

(30) Foreign Application Priority Data

May 15, 2014 (JP) ................................. 2014/101174

(51) Int. Cl.
*F16M 13/00* (2006.01)
*B60K 5/12* (2006.01)
(Continued)

(52) U.S. Cl.
CPC .............. *B60K 5/1208* (2013.01); *B60K 5/12* (2013.01); *B60K 5/1216* (2013.01); *F16F 3/0873* (2013.01); *F16F 15/08* (2013.01)

(58) Field of Classification Search
CPC .................................. F16F 15/08; F16F 15/04
(Continued)

(56) References Cited

U.S. PATENT DOCUMENTS 4,584,928 A * 4/1986 Haynes ..................... F16F 1/50
123/195 R
4,610,421 A 9/1986 Ohta et al.
(Continued)

FOREIGN PATENT DOCUMENTS

CN 102203351 A 9/2011
CN 102612458 A 7/2012
(Continued)

OTHER PUBLICATIONS

International Search Report of PCT/JP2015/062646 dated Jul. 14, 2015.
(Continued)

*Primary Examiner* — Steven M Marsh
(74) *Attorney, Agent, or Firm* — Sughrue Mion, PLLC

(57) ABSTRACT

To provide an engine unit support structure with excellent vibration damping performance and durability, the engine unit support structure (1) is provided with an engine unit (2) having an engine (22), a mounting base (3) for mounting the engine unit (2) thereon, and a plurality of elastic support bodies coupled to the engine unit (2) and the mounting base (3) to thereby support the engine unit (2), in which the plurality of elastic support bodies include a first elastic support body (4A) disposed under the lower surface (20) of the engine unit (2) in a position closest, than any other of the plurality of the elastic support bodies, to the rotation center of the output shaft of the engine (22) and three or more of second elastic support bodies (4B, 4B, . . . ), and the first elastic support body (4A) is disposed within a closed space
(Continued)

X in plan view formed by interconnecting the centers of the neighboring second elastic support bodies (4B, 4B, . . . ).

9 Claims, 3 Drawing Sheets

(51) Int. Cl.
  *F16F 15/08* (2006.01)
  *F16F 3/087* (2006.01)
(58) Field of Classification Search
  USPC .......................................... 248/603, 638, 640
  See application file for complete search history.

(56) References Cited

U.S. PATENT DOCUMENTS

| | | | | |
|---|---|---|---|---|
| 5,040,764 | A * | 8/1991 | Dubois | F16F 7/108 |
| | | | | 248/603 |
| 5,178,357 | A * | 1/1993 | Platus | F16F 3/026 |
| | | | | 248/619 |
| 5,449,153 | A * | 9/1995 | Catalano | F04D 29/668 |
| | | | | 267/141.2 |
| 6,830,125 | B1 * | 12/2004 | Bizlewicz | F16F 15/021 |
| | | | | 181/207 |
| 2004/0026838 | A1 | 2/2004 | Watatani et al. | |
| 2013/0068552 | A1 | 3/2013 | Kim et al. | |

FOREIGN PATENT DOCUMENTS

| | | |
|---|---|---|
| DE | 102011079111 A1 | 1/2013 |
| EP | 1350649 A1 | 10/2003 |
| GB | 475153 A | 11/1937 |
| JP | 56-018298 U | 2/1981 |
| JP | S62-12418 A | 1/1987 |
| JP | 63-006253 U | 1/1988 |
| JP | 636253 U | 1/1988 |
| JP | 64-027550 U | 2/1989 |
| JP | 2002-274196 A | 9/2002 |
| JP | 2005-059681 A | 3/2005 |
| JP | 2005-083019 A | 3/2005 |
| JP | 200559681 A | 3/2005 |
| JP | 2005-247249 A | 9/2005 |

OTHER PUBLICATIONS

Communication dated Feb. 3, 2017 issued by the European Patent Office in corresponding application No. 15792723.7.
Translation of International Preliminary Report on Patentability and Written Opinion, dated Nov. 24, 2016, from the International Bureau in counterpart International application No. PCT/JP2015/062646.
Written Opinion issued by the International Bureau in corresponding International Application No. PCT/JP2015/062646, dated Oct. 5, 2016.
Communication dated Nov. 27, 2017, from State Intellectual Property Office of the P.R.C. in counterpart application No. 2015800112279.

* cited by examiner

ENGINE UNIT SUPPORT STRUCTURE AND
ENGINE UNIT MOUNTING METHOD

CROSS REFERENCE TO RELATED
APPLICATIONS

This application is a National Stage of International Application No. PCT/JP2015/062646 filed Apr. 27, 2015, claiming priority based on Japanese Patent Application No. 2014-101174, filed May 15, 2014, the contents of all of which are incorporated herein by reference in their entirety.

TECHNICAL FIELD

The present invention relates to an engine unit support structure having an engine unit mounted on a mounting base via elastic support bodies.

BACKGROUND ART

An engine unit support structure known in the art has the engine unit supported by elastic support bodies (elastic members) in mounting the engine unit on the mounting base (see Patent Document 1, for instance).

RELATED ART DOCUMENT

Patent Document

Patent Document 1: Japanese Unexamined Patent Application Publication No. 2005-247249

SUMMARY OF THE INVENTION

Problems to be Solved by the Invention

However, the engine unit support structure mentioned above has the elastic support bodies disposed on respective side surfaces on one end side of the engine. And it has the other elastic support bodies disposed on the respective side surfaces on the other end side of the engine. Thus, when elastic support bodies of small spring constant are used giving priority to the vibration damping performance of the support structure, the deformation of the elastic support bodies may likely become large. Consequently, there will be room for improvement of the durability of the support structure. On the other hand, when elastic support bodies of large spring constant are used giving priority to the durability of the support structure, there will be room for improvement of the vibration damping performance of the support structure.

The present invention provides an engine unit support structure featuring both excellent vibration damping performance and excellent durability.

Means for Solving the Problem

The engine unit support structure according to the present invention includes an engine unit having an engine, a mounting base for mounting the engine unit thereon, and a plurality of elastic support bodies coupled to the engine unit and the mounting base and thereby supporting the engine unit. The plurality of elastic support bodies include a first elastic support body disposed under the lower surface of the engine unit in a position closest, among the plurality of elastic support bodies, to the rotation center of an output shaft of the engine and three or more of second elastic support bodies. And the first elastic support body is disposed within a closed space in plan view defined by interconnecting centers of neighboring second elastic support bodies. As a result, a shared load of the engine unit to be borne by each of the second elastic support bodies is reduced. Hence, rubber of smaller spring constant can be used for the second elastic support bodies. This leads to an improvement in the vibration damping performance of the engine unit support structure. At the same time, with the load of the engine unit borne by the first elastic support body and the three or more of the second elastic support bodies, the durability of the engine unit support structure can be improved. That is, the invention provides an engine unit support structure featuring both excellent vibration damping performance and excellent durability.

Also, a method of mounting an engine unit for forming the above-described engine unit support structure is as follows: In coupling the engine unit from above the first elastic support body and the second elastic support bodies coupled to the mounting base to the first elastic support body and second elastic support bodies, the engine unit is placed in such a way that the load of the engine unit acts first on the first elastic support body and then on the second elastic support bodies. After this, the engine unit is coupled to the first elastic support body and to the second elastic support bodies such that the load of the engine unit is borne in a shared manner by the first elastic support body and the second elastic support bodies. This provides a solution in cases where balance may be lost among the shared loads of the three or more of second elastic support bodies which bear the load of the engine unit. That is, as mentioned above, the shared loads of the engine unit to be borne by the three or more of second elastic support bodies are equalized by selecting the installation point of the first elastic support body within a closed space in a plan view. Hence, a stable engine unit support structure can be realized.

The invention will now be described in detail based on embodiments which do not intend to limit the scope of the claims of the present invention but exemplify the invention. All of the features and the combinations thereof described in the embodiments are not necessarily essential to the invention, and constructions and arrangements to be employed selectively are included in the invention.

MODES FOR CARRYING OUT THE
INVENTION

First Embodiment

An engine unit support structure 1 according to the first embodiment includes an engine unit 2, a mounting base 3, and a plurality of elastic support bodies 4.

Figure 1A:
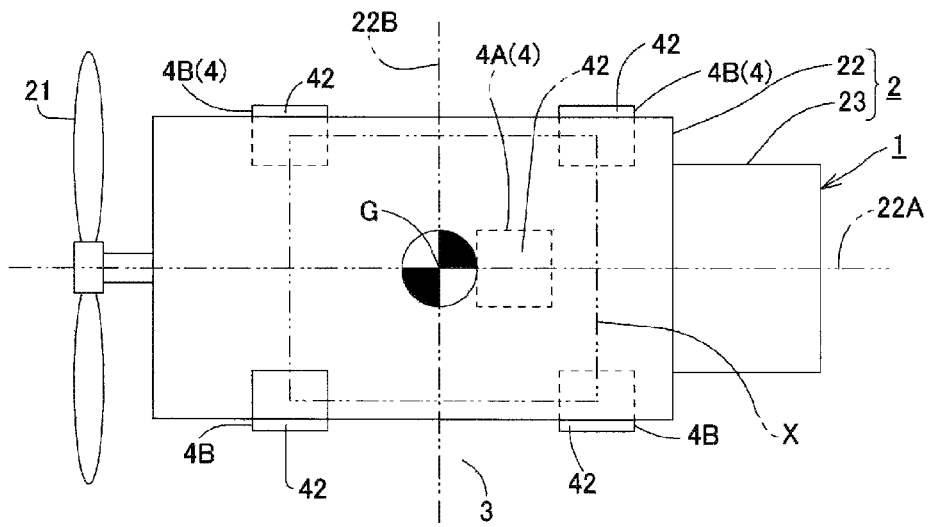
FIG. 1 shows an engine unit support structure, FIG. 1A being a plan view, FIG. 1B being a front view (a view as seen from a side of the engine unit), and FIG. 1C being a right side view (a view as seen from the back of the engine unit).
Figure 1B:
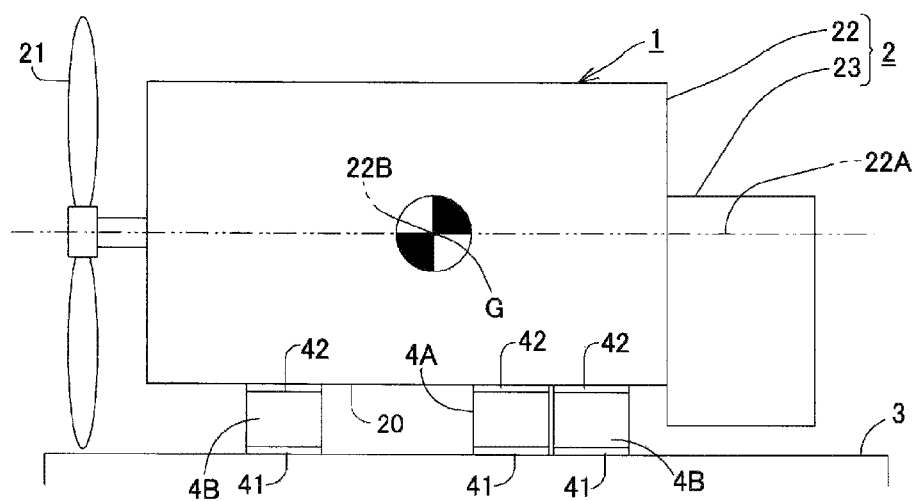
Figure 1C:
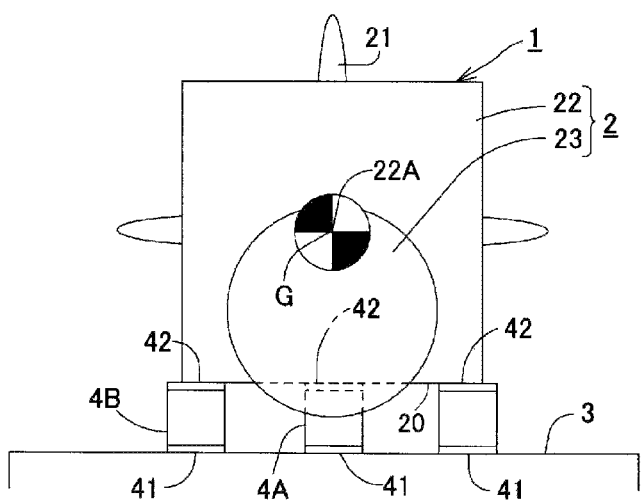

For example, with a working machine, such as a construction machine having actuators driven hydraulically, an engine unit 2, as shown in FIG. 1, is so configured as to have an engine 22 provided with a cooling fan 21 for cooling the engine and a hydraulic pump 23 driven by the engine 22. And a mounting base 3 is a vehicle body frame constituting the floor of a machine room of the working machine or a mounting base disposed on the vehicle body frame.

The engine unit 2, as shown in FIG. 1 for instance, is provided with a cooling fan on one end side of the engine 22 (at one end side in an extension direction of not-shown output shaft (crankshaft) of the engine 22) and a hydraulic pump 23 on the other end side of the engine 22.

As the plurality of elastic support bodies 4, 4, . . . , elastic support bodies having columnar rubber bodies as columnar elastic bodies may be used, for instance. The elastic support bodies 4 are coupled to the mounting base 3, which acts as a vibration receiver, via mountings 41, such as brackets or threaded rods, provided at a lower end thereof as one end, and coupled to the engine unit 2, which acts as a vibration generator, via mountings 42, such as brackets or threaded rods, provided at an upper end thereof as the other end.

The plurality of elastic support bodies 4, 4, . . . include, for instance, a first elastic support body 4A and four second elastic bodies 4B, . . . .

The first elastic support body 4A, which is placed under the lower surface 20 of the engine unit 2, is disposed in a position closest than any other of the plurality of elastic support bodies 4, 4, . . . to the rotation center 22A of the output shaft of the engine 22.

The four second elastic bodies 4B, 4B, . . . are disposed in peripheral positions of the lower surface 20 of the engine unit 2. That is, the four second elastic bodies 4B are disposed in positions further from the rotation center 22A of the output shaft of the engine 22 than the first elastic support body 4A, namely, on each side at one end side of the engine 22 and on each side at the other end side of the engine 22.

In other words, the first elastic support body 4A is disposed within a closed space X in plan view (see FIG. 1A) formed by linking the centers of the neighboring second elastic support bodies 4B, 4B, . . . . As a result, the shared load of the engine 2 to be borne by each of the four second elastic support bodies 4B, 4B, . . . can be reduced. This allows the use of rubber of smaller spring constant for the second elastic support bodies 4B. Hence, the vibration damping performance of the engine unit support structure 1 can be improved. At the same time, with the load of the engine unit 2 borne by the first elastic support body 4A and the four second elastic support bodies 4B, 4B, . . . , the durability of the engine unit support structure 1 can be improved. That is, the engine unit support structure 1 featuring both excellent vibration damping performance and excellent durability can be realized.

Also, an attempt is made to correct the variation in the shared load of the engine unit to be borne by each of the four second elastic support bodies 4B, 4B, . . . which are disposed in peripheral positions of the lower surface 20 of the engine unit 2. Accordingly, an installation point of the first elastic support body 4A is selected within a closed space X in plan view formed by linking the centers of the neighboring second elastic support bodies 4B, 4B, . . . . Thus, it becomes possible to equalize the shared loads of the engine unit to be borne respectively by the four second elastic support bodies 4B, 4B, . . . . In this manner, a stable engine unit support structure 1 is realized.

For example, the engine unit 2 is heavier on the other end side thereof where the hydraulic pump 23 is attached. Consequently, the shared loads of the engine unit to be borne by the second elastic support bodies 4B supporting the respective sides of the other end side of the engine unit 2 are greater than the shared loads of the engine unit to be borne by the second elastic support bodies 4B supporting the respective sides of the one end side (cooling fan 21 side) of the engine unit 2. Hence, there may be cases where the balance is lost among the shared loads of the engine unit borne by the four second elastic support bodies 4B, 4B, . . . . Also, there may be cases where the balance is lost among the shared loads of the engine unit 2 borne by the four second elastic support bodies 4B, 4B, . . . because the distances between the gravity center position of the engine unit 2 and the respective support points of the elastic support bodies are unequal. In such cases, as described above, through selection of an installation point of the first elastic support body 4A within a closed space X in plan view, it becomes possible to equalize the shared loads of the engine unit 2 to be borne respectively by the four second elastic support bodies 4B, 4B, . . . . In this manner, a stable engine unit support structure 1 can be realized.

Also, by employing elastic support bodies provided with columnar rubber bodies as the plurality of elastic support bodies 4, 4, . . . , the vibration damping performance of the engine unit support structure 1 can be further improved.

Second Embodiment

The first elastic support body 4A is installed in such a manner that the rotation center 22A of the output shaft, which is the rolling rotation shaft of the engine unit 2, is orthogonal in a vertical state to the central axis of a columnar rubber body forming the first elastic support body 4A. That is, as shown in FIG. 1 for instance, the first elastic support body 4A is disposed directly below the rotation center 22A of the output shaft as the rolling rotation shaft of the engine unit 2, namely, directly below the rolling rotation center of the engine unit 2. Thus, the effect of suppressing the transmission of rolling vibration of the engine unit 2 is enhanced.

Third Embodiment

The first elastic support body 4A is installed directly below the pitching rotation center 22B of the engine unit 2. Accordingly, the effect of suppressing the transmission of rolling vibration of the engine unit 2 is enhanced.

Fourth Embodiment

Figure 2A:
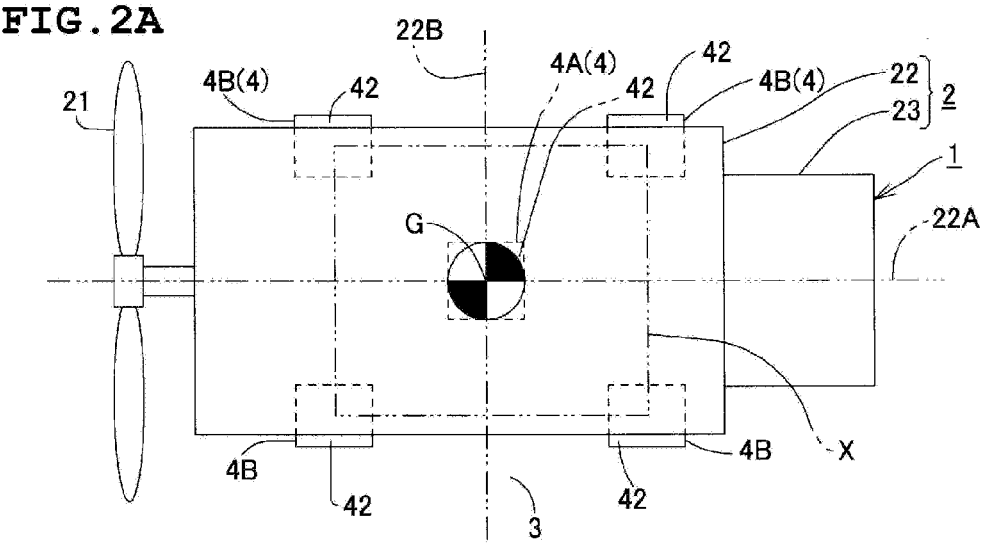
FIG. 2 shows an engine unit support structure, FIG. 2A being a plan view, FIG. 2B being a front view (a view as seen from a side of the engine unit), and FIG. 2C being a right side view (a view as seen from the back of the engine unit).
Figure 2B:
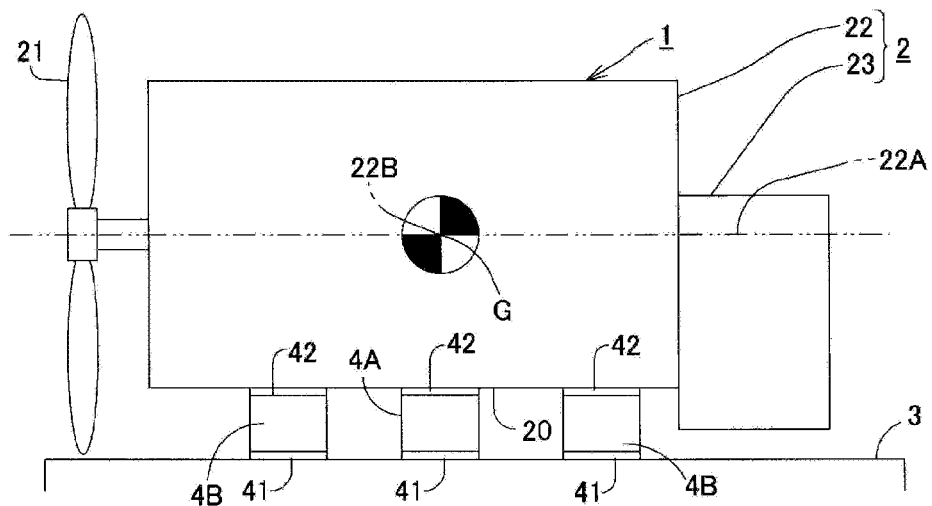
Figure 2C:
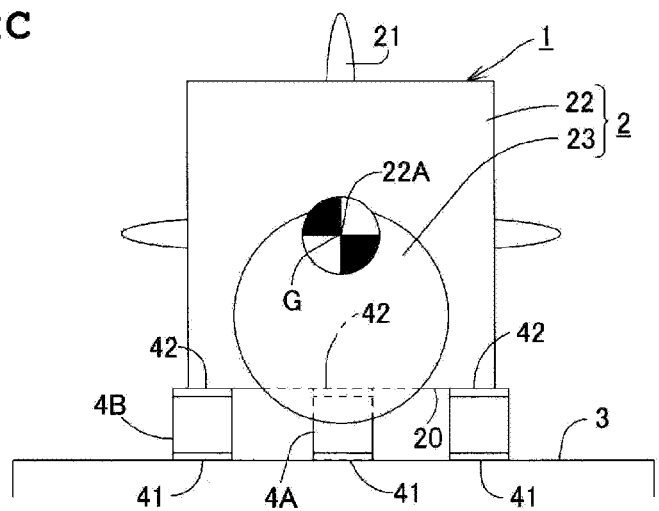

As shown in FIG. 2, the first elastic support body 4A is installed in such a manner that the gravity center G of the engine unit 2 is orthogonal in the vertical state to the central axis of the columnar rubber body forming the first elastic support body 4A. That is, the first elastic support body 4A is disposed directly below the gravity center G of the engine unit 2, which is the intersection where the rolling rotation center 22A of the engine unit 2 is orthogonal to the pitching rotation center 22B of the engine unit 2. Accordingly, the effect of suppressing the transmission of rolling vibration of the engine unit 2 and the effect of suppressing the transmission of pitching vibration of the engine unit 2 are enhanced.

Fifth Embodiment

The engine unit support structure is such that the shared load of the engine unit 2 to be borne by the first elastic support body 4A is greater than the shared load of the engine unit 2 to be borne by each of the second elastic support bodies 4B, 4B, . . . . This may result in a reduction in the shared load of the engine unit to be borne by each of four of the second elastic support bodies 4B, 4B, . . . . Hence, it becomes possible to use rubber of even smaller spring constant than that of the first embodiment as the second elastic support bodies 4B. Thus the vibration damping performance of the engine unit support structure 1 can be further improved. At the same time, since the load of the engine unit 2 is borne by the first elastic support body 4A and four of the second elastic support bodies 4B, 4B, . . . , the durability of the engine unit support structure 1 can be further improved.

Sixth Embodiment

The first elastic support body 4A to be used is such that the spring constant in the vertical direction (direction of supporting the engine unit 2) thereof is greater than the spring constant in the vertical direction of the second elastic support body 4B. Thus, the arrangement is such that the shared load of the engine unit 2 to be borne by the first elastic support body 4A is greater than that of the engine unit 2 to be borne by each of the second elastic support bodies 4B, 4B, . . . . And this arrangement that the shared load of the engine unit 2 to be borne by the first elastic support body 4A is greater than that of the engine unit 2 to be borne by each of the second elastic support bodies 4B, 4B, . . . achieves the effects as described in the fifth embodiment. That is, the vibration damping performance of the engine unit support structure 1 may be further improved. At the same time, the durability of the engine unit support structure 1 can be further improved also.

For example, the columnar rubber body constituting the first elastic support body 4A to be used may be one whose spring constant in the vertical direction is greater than the spring constant in the vertical direction of the second elastic support body 4B.

Seventh Embodiment

The first elastic support body 4A to be used may be one whose spring constant in the vertical direction (direction of supporting the engine unit 2) thereof is greater than the spring constant in the direction intersecting with the vertical direction. In other words, the first elastic support body 4A is such that the vertical spring is harder and the horizontal spring is softer, with the rigidity ratio being 0.4 or below, for instance. Then the vibration damping performance of the engine unit support structure 1 may be further improved, and at the same time, the durability of the engine unit support structure 1 can be further improved also.

That is, it is possible to obtain an engine unit support structure 1 which features both excellent vibration damping performance and excellent durability.

In other words, a columnar rubber body of the rigidity ratio of 0.4 or below may be used as the columnar rubber body constituting the first elastic support body 4A.

Eighth Embodiment

Next, a description is given of a method for mounting an engine unit to form the engine unit support structure as described in the first to seventh embodiments.

Figure 3A:
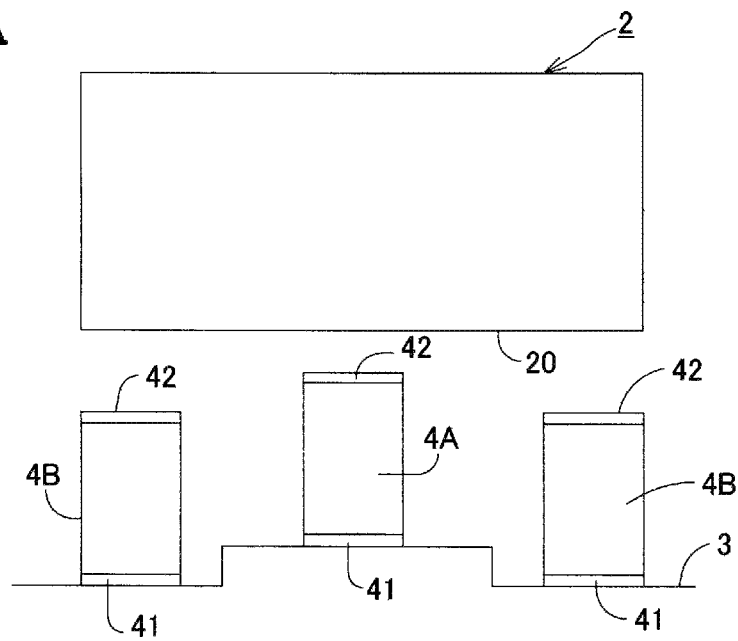
FIG. 3A and FIG. 3B illustrate a procedure of mounting an engine unit.
Figure 3B:
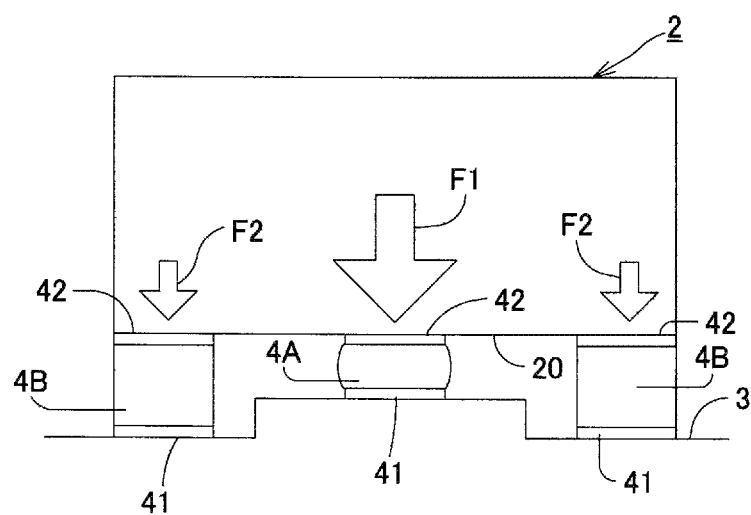

As shown in FIG. 3, as a plurality of elastic support bodies 4, 4, . . . , one first elastic support body 4A and three or more of second elastic support bodies 4B, 4B, . . . are used as described above. Now the engine unit 2 is coupled from above to the first elastic support body 4A and second elastic support bodies 4B that are coupled to the mounting base 3. In this coupling, the arrangement is such that the first elastic support body 4A is disposed higher than the second elastic support bodies 4B when the load of the engine unit 2 is not acting on the first elastic support body 4A and the second elastic support bodies 4B (see FIG. 3A). This is to allow the load of the engine unit 2 to act first on the first elastic support body and then on the second elastic support bodies. Then the engine unit 2 is coupled to the first elastic support body 4A and the second elastic support bodies 4B. Thus, the load of the engine unit 2 is borne in a shared manner by the first elastic support body 4A and the second elastic support bodies 4B (see FIG. 3B). In this manner, it is possible to have more of the load of the engine unit 2 borne by the single first elastic support body 4A. That is, as shown in FIG. 3B, it is possible to have the first elastic support body 4A bear a load F1, which is greater than a load F2 acting on the second elastic support body 4B. Accordingly, a rubber of a smaller spring constant can be used as the second elastic support bodies 4B. This further improves the vibration damping performance of the engine unit support structure 1. At the same time, the durability of the engine unit support structure 1 can also be further improved because the load of the engine unit 2 is borne by the first elastic support body 4A and the four second elastic support bodies 4B, 4B, . . . .

Also, there may be cases where balance is lost between the shared loads of the four second elastic support bodies 4B, 4B, . . . which bear, in a shared manner, the load of the engine unit 2. However, as described already, selection of the installation point of the first elastic support body 4A within a closed space X in plan view makes it possible to equalize the shared loads of the four second elastic support bodies 4B, 4B, . . . bearing, in the shared manner, the load of the engine unit 2. As a result, a stable engine unit support structure 1 can be realized.

Moreover, the above-mentioned advantageous effect can be achieved by using the first elastic support body 4A whose spring constant in the vertical direction (direction of supporting the engine unit 2) is the same or equivalent to that of the second elastic support bodies 4B. In such a case, the cost of the elastic support bodies 4 can be reduced because the same or equivalent elastic support bodies can be used as the first elastic support body 4A and the second elastic support bodies 4B.

It is to be noted, however, the first elastic support body 4A whose spring constant in the vertical direction (direction of supporting the engine unit 2) is different from that of the second elastic support bodies 4B may be used.

According to the present invention, there may be two or more of the first elastic support body 4A which are disposed in a position closest to the rotation center 22A of the output shaft of the engine 22, among the plurality of elastic support bodies 4, 4, . . . disposed under the lower surface 20 of the engine unit 2.

Also, it is acceptable if there are three or more of the second elastic support bodies 4B. And the three or more of the second elastic support bodies 4B may constitute an engine unit support structure in which the first elastic support body 4A is disposed within a closed space X in plan view defined by interconnecting the centers of the neighboring second elastic support bodies 4B.

It is to be noted that the vibration damping unit disclosed in Japanese Unexamined Patent Application Publication No. 2009-228770 may be used as the second elastic support bodies 4B, for instance.

That is, the vibration damping unit to be used may be a sandwich type with a pair of vibration damping rubber structures provided with a bracket joining section and a bolt hole being sandwiched between a pair of plates. And one end of the bracket coupled to the bracket joining section of the pair of vibration damping rubber structures is coupled, for instance, to an engine unit 2 as a vibration generator or to a mounting base 3, such as a vehicle body frame, as a vibration receiver. And one of the pair of plates is coupled, for instance, to the mounting base 3, such as the vehicle body frame, as the vibration receiver or to the engine unit 2 as the vibration generator.

The pair of vibration damping rubber structures each includes a cylinder having a bolt hole formed by an intra-cylinder space, a vibration damping rubber coupled by cure adhesion to the periphery of the cylinder so as to surround the periphery of the cylinder, and an annular member, the center thereof being the center axis of the cylinder, attached to the other end surface of the vibration damping rubber located at the other end side of the cylinder. The annular member has a cylindrical part of a diameter larger than that of the cylinder coaxially around the center axis of the cylinder and a flange extending outward from one end of the cylinder. And the flange surface on one end of the flange is coupled by cure adhesion or the like to the other end surface of the vibration damping rubber.

The cylindrical part is inserted into a coupling hole formed in the other end side of the bracket from the other end side of the cylindrical part of one of the vibration damping rubber structures. Also, the cylindrical part is inserted from the other end side of the cylindrical part of the other of the vibration damping rubber structures. Thus, the other ends of the cylinders and the other ends of the cylindrical parts of the pair of the vibration damping rubber structures are respectively placed opposite to each other, and the part surrounding the coupling hole in the other end portion of the bracket is sandwiched between the other flange surfaces of the respective flanges of the pair of the vibration damping rubber structures. And one of the plates is placed at the end face of the vibration damping rubber located on the one end side of the cylinder of one of the vibration damping rubber structures, and the other of the plates is placed at the end face of the vibration damping rubber located on the one end side of the cylinder of the other vibration damping rubber structure. Then a bolt is inserted through the bolt hole formed in one of the plates, the bolt hole which is the inner side of each cylinder of the pair of the vibration damping rubber structures, and the bolt hole formed in the other of the plates. And a nut is coupled with the threaded end of the bolt protruding out from the bolt hole in the other plate. Thus formed is a vibration damping unit.

Then one end of the bracket of the vibration damping unit is coupled to an engine unit 2, for instance, and the other plate of the vibration damping unit is coupled to a mounting base 3, for instance. In this manner, the vibration damping unit functions as the second elastic support body 4B.

If the above-described vibration damping unit is used as the second elastic support bodies 4B, then the second elastic support bodies 4B will work as a stopper at the time of a vehicle body rebounding. Hence, it is possible to prevent a tensile force from entering the first elastic support body 4A. This produces an effect of improving the durability of the first elastic support body 4A.

The second elastic support bodies 4B to be used may be ones of mutually different structures.

The elastic support bodies 4 may be ones equipped with springs instead of rubbers.

Also, the mountings under the engine unit for the second elastic support bodies 4B may be located in a position higher than the mounting for the first elastic support body.

The present invention is applicable to engine unit support structures for agricultural machinery, ships, automobiles, and the like and to the method for mounting such engine units, also. For example, it is applicable to support structures of engine units equipped with an engine and transmission or of engine units having an engine only and to the method for mounting such engine units.

DESCRIPTION OF REFERENCE NUMERALS 1 engine unit support structure
2 engine unit
3 mounting base
4A first elastic support body
4B second elastic support body
20 lower surface of engine unit
22 engine
G gravity center
X closed space in plan view

The invention claimed is:

1. An engine unit support structure comprising:
   an engine unit having an engine;
   a mounting base for mounting the engine unit thereon; and
   a plurality of elastic support bodies coupled to the engine unit and the mounting base to thereby support the engine unit,
   wherein the plurality of elastic support bodies includes three or more of second elastic support bodies, and a first elastic support body which is disposed under a lower surface of the engine unit and in a position closer than any other of the plurality of elastic support bodies—to a rotation center of an output shaft of the engine,
   wherein the first elastic support body is disposed within a closed space in plan view formed by interconnecting centers of neighboring second elastic support bodies, and
   wherein a spring constant of the first elastic support body in the vertical direction is greater than a spring constant of the first elastic body in the direction intersecting with the vertical direction.

2. The engine unit support structure according to claim 1, wherein the first elastic support body is disposed directly below a rolling rotation center of the engine unit.

3. The engine unit support structure according to claim 1, wherein the first elastic support body is disposed directly below a pitching rotation center of the engine unit.

4. The engine unit support structure according to claim 1, wherein the first elastic support body is disposed directly below a gravity center of the engine unit.

5. The engine unit support structure according to claim 1, wherein the shared load of the engine unit to be borne by the first elastic support body is greater than the shared load of the engine unit to be borne by each of the second elastic support bodies.

6. The engine unit support structure according to claim 1, wherein a spring constant in a vertical direction of the first elastic support body supporting the engine unit is greater than a spring constant in a vertical direction of the second elastic support bodies supporting the engine unit.

7. The engine unit support structure according to claim 1, wherein the elastic support bodies comprise rubber.

8. A method of mounting an engine unit for forming an engine unit support structure according to claim 1 comprising:
   placing the engine unit in such a way that a load of the engine unit acts first on the first elastic support body and then on the second elastic support bodies in coupling the engine unit from above the first elastic support body and the second elastic support bodies coupled to the mounting base to the first elastic support body and the second elastic support bodies; and then
   coupling the engine unit to the first elastic support body and the second elastic support bodies such that the load of the engine unit is borne in a shared manner by the first elastic support body and the second elastic support bodies.

9. The engine unit support structure according to claim 1, wherein the first elastic support body contacts with the engine unit and with the mounting base, and wherein the second elastic support bodies contact with the engine unit and with the mounting base.

* * * * *